Patented Oct. 20, 1953

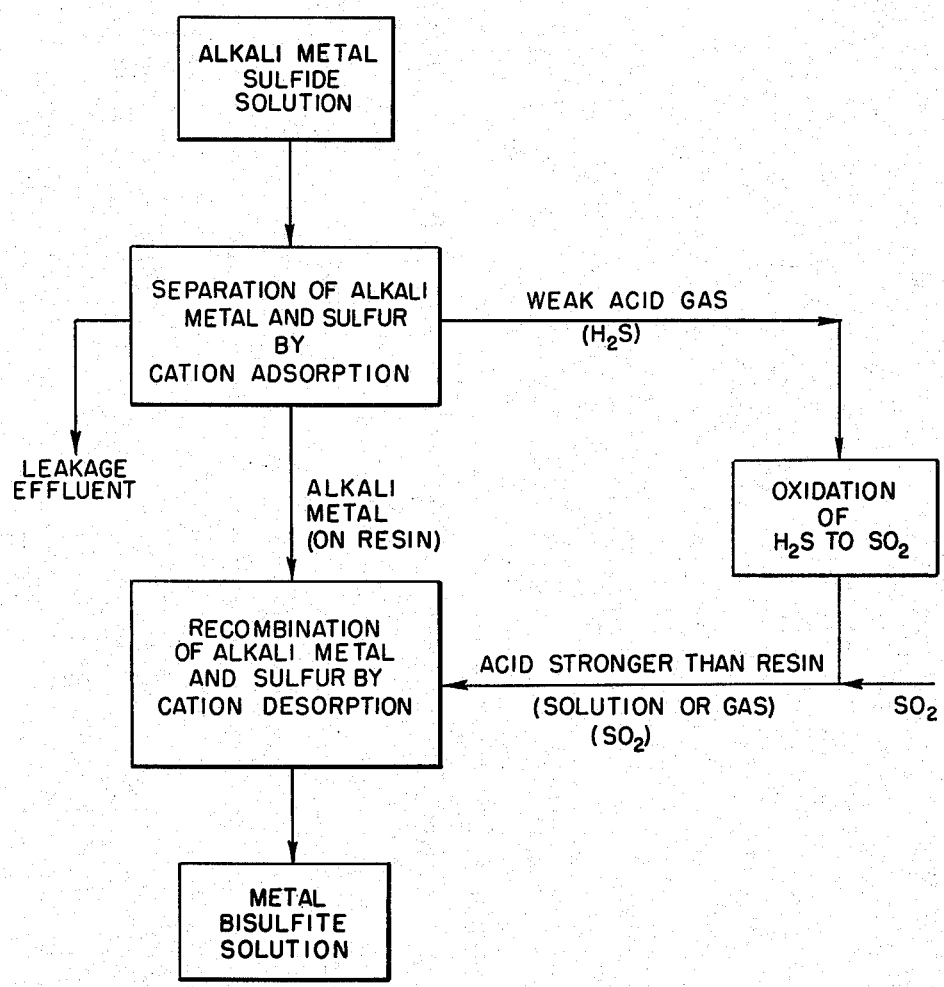

2,656,249

UNITED STATES PATENT OFFICE 2,656,249

PROCESS FOR THE PREPARATION OF A SODIUM BISULFITE SOLUTION

Kenneth Russell Gray and Hartzell Lance Crosby, Shelton, Wash., assignors to Rayonier Incorporated, Shelton, Wash., a corporation of Delaware Application July 15, 1950, Serial No. 174,102

7 Claims. (Cl. 23—130)

This invention relates to the production of alkali metal bisulfite and has for its object the provision of a process of producing alkali metal bisulfite by ion exchange. More particularly, the invention provides a process of treating aqueous solutions of soda salts of weakly acidic volatile acids with a cation exchange resin having active exchange centers in hydrogen form which are substantially less acidic than sulfurous acid resulting in the adsorption of the sodium of such salts on the resin and the liberation of the weak volatile acid in gaseous form. The invention provides for the further treatment of the resin having adsorbed sodium with sulfurous acid to form sodium bisulfite.

The preparation of sodium sulfite or bisulfite by direct oxidation or reduction of other sodium-sulfur compounds has not been successfully accomplished heretofore since the reactions either do not proceed to completion or result in the formation of a complex mixture containing polysulfide, thiosulfate, polythionates or other undesirable by-products. The process of this invention presents an efficient method of indirect oxidation of sodium sulfide whereby the soda and sulfur are separated temporarily by ion exchange, permitting oxidation of the sulfur constituent, under controlled conditions, to $SO_2$ which being relatively stable can be obtained without undesirable by-products. Recombination of $SO_2$ with the sodium on the resin is readily effected to produce the sodium salts of sulfurous acid free from undesirable contaminants such as sulfides, sulfur, thiosulfates, polythionates, etc. By treating the resin containing the adsorbed sodium with sulfurous acid, a solution containing sodium bisulfite is formed and the resin regenerated in form for reuse.

The invention is advantageously applicable to the treatment of such sodium salts of weakly volatile acids as $H_2S$ and $CO_2$ from various sources such as natural brines or mineral deposits, the smelting of carbonaceous matter containing sodium and sulfur to form sodium salts of weakly acidic acids, and the like. Our copending applications Serial Nos. 174,103 and 174,104, filed July 15, 1950, describe and claim that aspect of our invention concerned with pulping operations and the recovery of chemicals therein.

The invention not only provides an efficient process for producing sodium bisulfite but provides a simple method for the production of pure chemical (sodium bisulfite) from crude soda chemicals, or complex mixtures of soda chemicals, wherein at least one constituent is the salt of a weak volatile acid.

In one preferred application, the sulfur dioxide used for treating the resin containing sodium is obtained at least in part by the oxidation of the hydrogen sulfide evolved in the above treatment.

Where the solution containing the sodium salt of weakly acidic volatile acids also contains the sodium salts of relatively nonvolatile, strong acids, the resin treatment will adsorb the sodium component of only the weakly acidic volatile acids. Thus, since the weakly acidic volatile acids are liberated from the solution in gaseous form and the sodium is adsorbed on the resin, a complete separation of the sodium salts of the weakly acidic volatile acids from the sodium salts of the relatively nonvolatile, strong acids can be effected.

Among the resins which we have found particularly applicable in our process are those containing carboxylic acid or phenolic hydroxyl exchange centers, or both, and in particular, the newer synthetic organic exchange resins containing these groups exclusively and which are characterized by high adsorptive capacities. A number of resins of this type are at present available. The carboxylic acid type resins are especially desirable. One such resin which we have found particularly suitable is sold under the trade name of "Amberlite IRC-50."

The invention will be better understood with reference to the accompanying drawing which illustrates diagrammatically by flow sheet an operation relating especially to the treatment of an alkali metal sulfide solution.

A suitable resin is contacted with a solution of soda salts containing at least one sodium salt of a weakly acidic volatile acid, e. g. sodium sulfide, sodium hydrosulfide, sodium carbonate or sodium bicarbonate whereupon sodium is adsorbed on the resin and the weakly acidic volatile acid or acids are evolved (e, g. hydrogen sulfide or/and carbon dioxide). This may be accomplished in a number of ways, as for example by passing the solution through a bed of the resin or by adding the resin to the solution either batchwise or in a continuous manner, later separating the resin from the solution by mechanical means.

We have found that the process may very advantageously be conducted at elevated temperature, as for example, 50–100° C., whereby the effective capacity of the resin is not only materially increased due to the temperature effect but due to the reduced solubility of the evolved volatile acids. Thus, the volatile reaction product (e. g. $H_2S$ or $CO_2$ or both) is effectively removed from the solution enabling very rapid approach to equilibrium conditions and facilitating adsorption of the soda. Removal of the volatile acid may also be further facilitated by carrying out this phase under vacuum.

Following the adsorption step, the resin is washed in a conventional manner and the adsorbed soda removed by a treatment with sulfurous acid solution. In place of sulfurous acid solution, the resin containing sodium may be treated with sulfurous acid formed in situ by passing sulfur dioxide containing gases in contact with the wet resin.

It is understood that, depending on the characteristics of the installation, the sodium adsorption and/or desorption may be carried out in more than one step.

It is a desirable feature of our process that many impurities present in the original solution (e. g. chlorides, sulfates, thiosulfates, etc.) remain in the liquor drained from the resin following the adsorption step and therefore the regenerated solution or product liquor is recovered as a high quality material.

Any sulfide or hydrosulfide content of the influent solution is largely released as hydrogen sulfide during the soda adsorption stage. With influent solutions of substantial sulfide content, the hydrogen sulfide is evolved in substantial concentration and may be readily and practically burned to sulfur dioxide free from undesirable by-products, whereupon it may be used in the process if desired for removal of the sodium from the resin as sodium bisulfite.

The solution, from which all or a portion of the soda has been removed, is drained or otherwise mechanically separated from the resin at the completion of the adsorption step. This said effluent solution has been termed by us the "leakage" and the term "leakage" is hereinafter used in the specification in this sense.

In one method of applying our process, where only salts of weakly acidic volatile acids are present, the ratio of the amount of resin used in the treatment to the amount of soda salts of the weakly acidic volatile acids is such that substantially all of the soda of the influent solution is adsorbed on the resin and substantially all of the volatile acids are liberated in gaseous form. The leakage from this process, containing substantially no sodium ions, may be readily stripped of any remaining traces of volatile hydrogen sulfide and may therefore be reused as water in the process or discarded with no attendant waste disposal problem.

In another method of applying our process, the sodium containing solution influent to the resin treatment contains, in addition to the soda salts of weakly acidic volatile acids, other soda salts, such as soda salts of strong acids, which are not decomposed in the exchange reaction and therefore remain in the leakage.

By limiting the ratio of influent liquor to resin, relatively complete removal of the soda from the salts of the weakly acidic volatile acids may be achieved, in which case the leakage contains largely the sodium salts of the relatively nonvolatile acids and may be either recycled in the process, treated for recovery of the inactive soda values, or discarded.

Where the liquor influent to the resin contains sodium salts of the weakly acidic volatile acids substantially in excess of the effective capacity of the resin, and in addition sodium salts of relatively nonvolatile acids, the leakage will contain substantially the total amount of the sodium salts of the relatively nonvolatile acids as well as the unadsorbed portion of the soda salts of the weakly acidic volatile acids. Operation in this manner provides a very high soda ion concentration in the influent solution throughout the reaction stage, thereby resulting in exceptionally high effective capacities and efficient use of the resin. The leakage from such operation would contain considerable soda values and could be recycled, treated for further soda recovery, or used elsewhere in the process.

Neutral sodium sulfite can be conveniently prepared for various uses by reacting sodium bisulfite recovered in the manner heretofore described with sodium carbonate or bicarbonate at an elevated temperature. Caustic soda may also obviously be used for reacting with the sodium bisulfite to produce sodium sulfite.

Sodium bicarbonate or caustic soda for such use may be obtained in a modification of the invention. In such modification, the resin containing adsorbed sodium is regenerated at least in part with carbonic acid, whereupon sodium salts of carbonic acid would be formed which could be used as such or converted to caustic soda in a causticizing operation. Depending upon the products desired a split regeneration first with carbonic acid to the desired degree, then with sulfurous acid to complete the regeneration may be used. By controlling the regeneration to give sodium bicarbonate and sodium bisulfite in substantially equimolecular quantities, the resulting product solutions may be mixed at an elevated temperature whereupon carbon dioxide is evolved and a solution of normal sodium sulfite substantially free from bicarbonate is formed.

In order to utilize the maximum effective capacity of the resin, it may be desirable to regenerate with solutions containing carbon dioxide or sulfur dioxide in excess of the theoretically required amount. Following regeneration the resulting effluent may be stripped of the excess volatile constituent to produce solutions substantially free of excess regenerant.

In one modification our process may be advantageously applied to the preparation of pure chemicals from naturally occurring mineral deposits or brines containing sodium salts of weakly acidic volatile acids. An analysis of one such deposit is shown below.

*Analysis of natural brine from Soap Lake, Washington*

| | Wt. per cent of T. S. |
|---|---|
| Sodium carbonate | 33.9 |
| Sodium bicarbonate | 16.2 |
| Sodium sulfate | 26.6 |
| Sodium chloride | 20.1 |
| Minor constituents | 3.2 |
| Total | 100.0 |

Whereas separation of these salts by crystallization techniques would present considerable difficulty, the carbonate and bicarbonate fraction of such a brine can be readily and simply recovered as sodium bisulfite by application of our ion exchange process.

In another modification of our process, sodium sulfate may be smelted with coal or other carbonaceous matter to yield a smelt containing sodium sulfide and carbonate. This may be dissolved to form a solution which can be readily converted to sodium bisulfite by our process in a manner similar to that outlined generally for solutions containing sodium sulfide or carbonate. In that our process effects a purification, extremely impure sodium sulfate may be used as a raw material. In fact, naturally occurring sodium sulfate or chemical wastes containing sodium sulfate may be used even in the presence of considerable contaminants such as chlorides, carbonates, etc.

Ion exchange resins are in general porous, cross-linked polymeric materials which contain ionizable groups throughout the resin which are capable of exchanging one ion for another. They may thus be considered to be solid gel structures of an ionic nature.

The process of the invention is not limited to any particular manner of preparation of the carboxylic acid or phenolic hydroxyl type ion exchange resins used. Some methods whereby satisfactory weakly acidic resins may be prepared follow.

Carboxylic acid type resins may be prepared by polymerizing or co-polymerizing unsaturated organic acids or their anhydrides under conditions whereby cross-linked polymers are formed. Alternatively, esters of unsaturated organic acids may be polymerized to form a cross-linked resin and later saponified. Again, non-cross-linked alkali-soluble polymers containing carboxyl groups may be subjected to a cross-linking reaction to prepare an insoluble ion exchange resin. Again, carboxylic acid groups may be introduced into natural polymers not already containing these groups. In such cases, where necessary to obtain insolubility, a prior, concurrent, or subsequent cross-linking treatment would be effected. Introduction of carboxyl groups could be effected by such means as substitution of carboxy-alkyl groups or by partial oxidation of the original structure.

Phenolic hydroxyl type ion exchange resins may be prepared by polymerizing phenols (preferably polyphenols) to give a porous cross-linked polymer, as, for example, by use of suitable amounts of formaldehyde. Naturally occurring tannins provide an economically attractive source of polyphenols for this purpose. Alternatively, phenolic hydroxyl groups may be produced in naturally occurring polymeric materials not containing appreciable amounts of this group by such means as hydrolysis of phenol-ether or ester groups in the original molecule. Again, in such cases where necessary to obtain insolubility, prior, concurrent, or subsequent cross-linking will be effected.

Ion exchange resins containing both carboxyl and phenolic hydroxyl groups may be prepared by polymerizing simple molecules containing both carboxylic acid and phenolic hydroxyl groups. Alternatively, such resins may be prepared by subjecting polymeric materials containing phenolic hydroxyls as the only exchange groups to procedures whereby carboxylic acid groups are introduced in addition to the phenolic hydroxyl groups. Here also, where necessary to obtain insolubility, prior, concurrent, or subsequent cross-linking will be effected.

Examples illustrating the process of the invention as well as the preparation of some weakly acidic resins are given below.

EXAMPLE I

Ninety ml. of styrene, 60 ml. of a divinylbenzene solution containing 20-25% divinylbenzene dissolved in other aromatic hydrocarbons, 100 gms. of maleic anhydride, and 50 ml. of acetone were heated on a steam bath for a period of two hours. Temperature in the mixture rose to a maximum of 107° C. and dropped to 90° C. at the end of the two hour period. The product was then heated in an oven at 135° C. for three hours. It was then washed thoroughly with acetone, soaked for 18 hours in 5% NaOH and then thoroughly washed with water and dried. Yield of product was 121 grams.

Three-hundred ml. of this wet resin in hydrogen form was slurried with 100 ml. of solution containing 76.5 gm. sodium per liter, 80% of which was present as sulfide and carbonate; the balance being present as sulfate, chloride, thiosulfate and sulfite. The reaction was allowed to proceed for 15 minutes at atmospheric pressure and at 80° C., during which time hydrogen sulfide and carbon dioxide were spontaneously evolved from the solution and sodium was adsorbed on the resin. The resin was then separated from the solution, washed, and treated with 500 ml. of sulfurous acid containing 30 grams sulfur dioxide for 15 minutes at 25° C. and atmospheric pressure. The product solution containing all of the sodium formerly adsorbed on the resin was drained off, and the resin was washed, whereupon it was ready for re-use. In this experiment 6.9 gm. sodium was adsorbed by the 300 ml. of resin and was regenerated by means of sulfurous acid.

EXAMPLE II

Using automatic ion exchange equipment, 500 repeated cycles were carried out with the following average results: 4000 ml. wet carboxylic acid type cation exchange resin (sold commercially under the trade name of "Amberlite IRC-50") in hydrogen state was treated with 3.78 liters of solution containing 110 gm. $Na_2O$ per liter and having the following composition (expressed as mol per cent $Na_2O$): $Na_2S$ 65%, $Na_2CO_3$ 15%, $Na_2SO_4$ 15%, NaCl 3%, $Na_2S_2O_3$ 1.6%, $Na_2SO_3$ 0.4%. This treatment was conducted at 50° C. for 15 minutes at atmospheric pressure during which period $H_2S$ and $CO_2$ were spontaneously evolved and 210 gm. sodium was adsorbed on the resin. (This represents adsorption of 68% of the total influent sodium or 85% of the sodium initially present as salts of weak volatile acids.) Following a brief wash, the resin was treated with sulfurous acid containing 25 gm. $SO_2$ per liter to produce a solution of sodium bisulfite at a concentration of 7.4 grams sodium per liter and containing all of the sodium formerly adsorbed on the resin (210 grams).

At the completion of every 100 cycles the sodium adsorption capacity of the resin was measured and at the completion of 500 cycles the total resin volume was measured and the resin was screened. No loss of sodium adsorption capacity had occurred and no measurable decrease in resin volume or appreciable change in screen analysis was found.

EXAMPLE III 1500 grams of quebracho tannin were dissolved in 1500 ml. of water in an autoclave and 609 ml. of formalin and 15 ml. of concentrated hydrochloric acid were added. The mixture was then heated with a steam jacket, with a steam pressure of 115 lbs./sq. in. in the jacket. Heating was continued for 3 hours, during which time the temperature reached 135° C. in the autoclave. The mass was then removed from the autoclave, dried at low temperature and heated at 105° C. for a total of 36 hours. The product was then ground and screened to remove fines.

200 ml. of this wet resin in hydrogen form was slurried with 200 ml. of solution containing 100 gm. sodium per liter, 85% of which was present as sulfide and carbonate; the balance being present as sulfate, chloride, thiosulfate and sulfite. The reaction was allowed to proceed for 15 minutes at atmospheric pressure and at the desired temperature, during which time hydrogen sulfide and carbon dioxide were spontaneously evolved from the solution and sodium was adsorbed on the resin. The resin was then separated from the solution, washed, and treated with 500 ml. of sulfurous acid containing 30 grams sulfur dioxide for 15 minutes at 25° C. and atmospheric pressure. The product solution containing all the sodium formerly adsorbed on the resin was drained off and the resin was washed, whereupon it was ready for re-use. Typical results of such an experiment are as follows:

| Resin | Temperature of Sodium Adsorption, °C. | Sodium Adsorbed by 100 ml. Wet Regenerated Resin, gms. | Sodium Recovered by Regeneration with Sulfurous Acid, gms. |
|---|---|---|---|
| Phenolic Hydroxyl | 26 | 2.1 | 2.16 |
| Resin (Prepared as described above) | 82 | 2.8 | 2.92 |

We claim:

1. A process for the preparation of a sodium bisulfite solution which comprises treating a solution containing a sodium salt of a weakly acidic volatile acid of the group consisting of hydrogen sulfide and carbonic acid with a cation exchange resin having active exchange centers in hydrogen form which are substantially less acidic than sulfur dioxide and evolving a substantial portion of said volatile acid in gaseous form and adsorbing sodium on the resin, and treating said resin containing adsorbed sodium with sulfurous acid to form a solution containing sodium bisulfite.

2. The process according to claim 1 in which the solution containing the sodium salt of the weakly acidic acid also contains a sodium salt of a strong acid.

3. The process according to claim 1 in which the solution containing the sodium salt of the weakly acidic acid also contains a sodium salt of a relatively non-volatile acid.

4. The process according to claim 1 in which the solution treated is a brine of naturally occurring salts.

5. The process according to claim 1 in which the resin is a resin having carboxylic acid-type exchange centers in hydrogen form.

6. The process according to claim 1 in which the resin is a resin having phenolic hydroxyl exchange centers in hydrogen form.

7. The process according to claim 1 in which the resin is a resin having in hydrogen form both carboxylic acid-type and phenolic hydroxyl exchange centers.

KENNETH RUSSELL GRAY.
HARTZELL LANCE CROSBY.

References Cited in the file of this patent

UNITED STATES PATENTS

| Number | Name | Date |
|---|---|---|
| 1,545,522 | Richter | July 14, 1925 |
| 1,638,492 | Laury | Aug. 9, 1927 |
| 2,104,501 | Adams et al. | Jan. 4, 1938 |
| 2,409,861 | Hunter et al. | Oct. 22, 1946 |

FOREIGN PATENTS

| Number | Country | Date |
|---|---|---|
| 118,486 | Australia | May 4, 1944 |
| 521,207 | Great Britain | May 15, 1940 |